Aug. 9, 1949.  E. F. POTTER  2,478,636
ARC WELDING APPARATUS
Filed Dec. 26, 1947  2 Sheets-Sheet 1
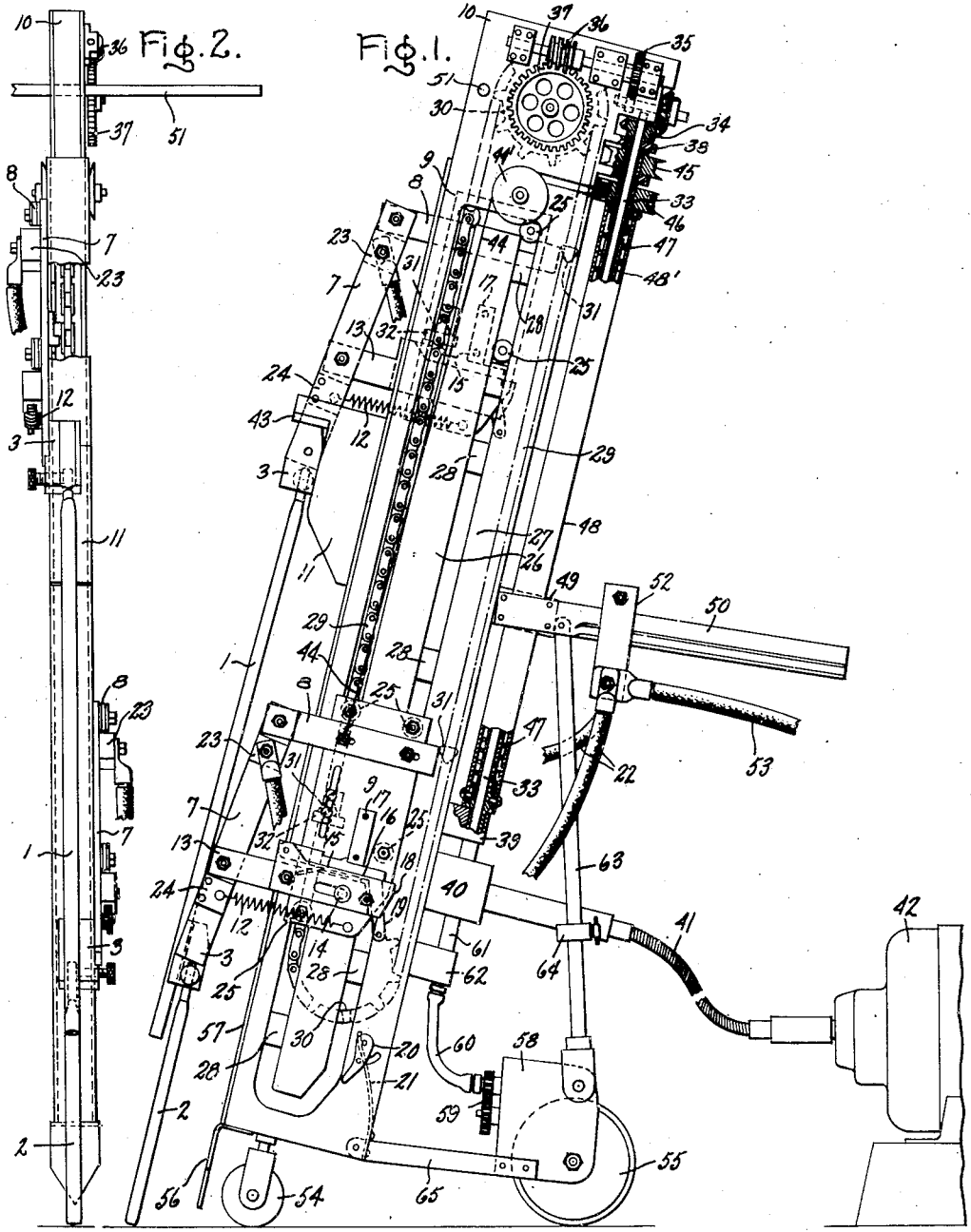
Inventor:
Everett F. Potter,
by Claude W. Mott.
His Attorney.

Aug. 9, 1949.  E. F. POTTER  2,478,636
ARC WELDING APPARATUS
Filed Dec. 26, 1947  2 Sheets-Sheet 2
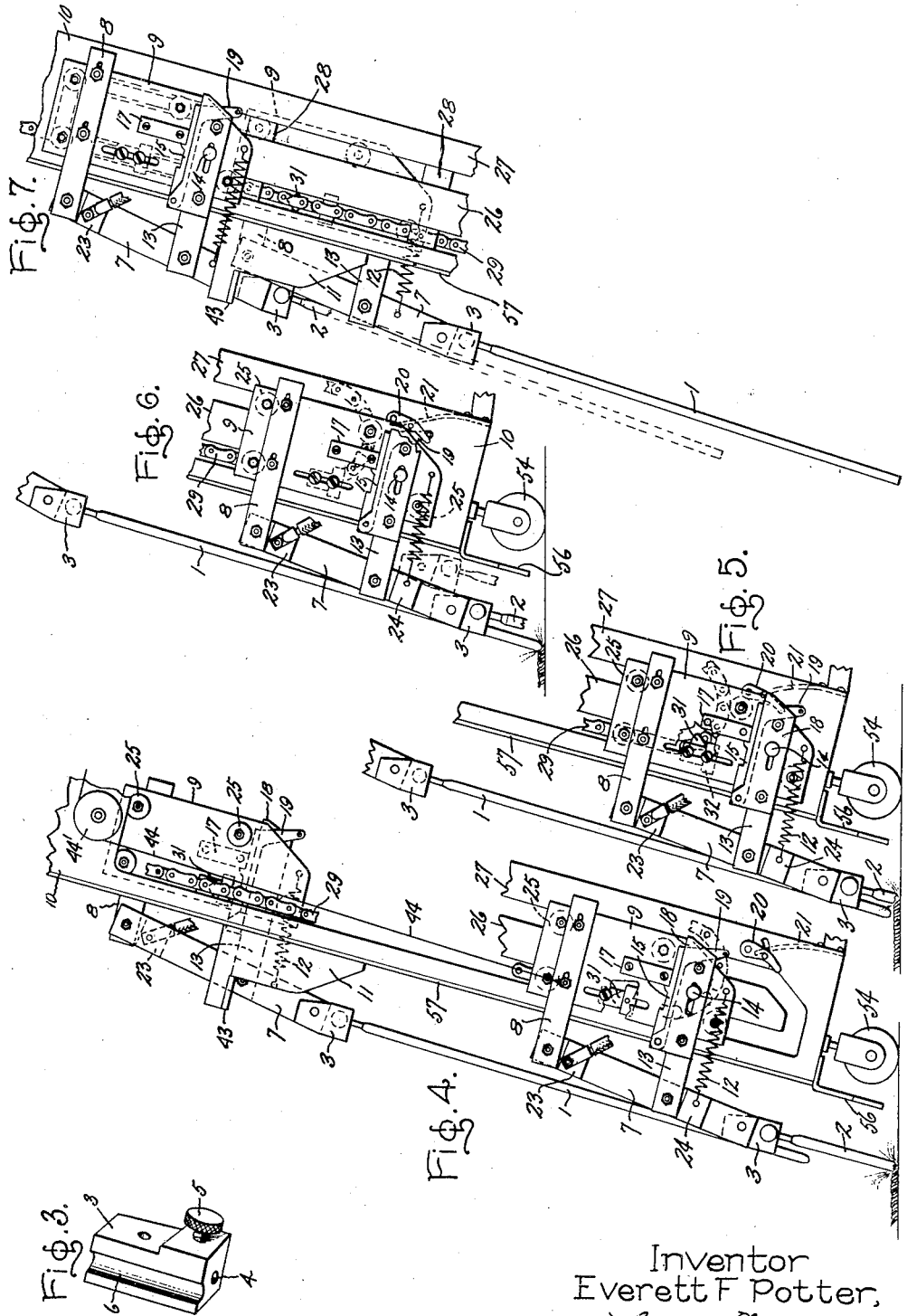
Inventor
Everett F. Potter,
by Claude W. Mitt.
His Attorney Patented Aug. 9, 1949

2,478,636

UNITED STATES PATENT OFFICE 2,478,636

ARC WELDING APPARATUS

Everett F. Potter, Schenectady, N. Y., assignor to General Electric Company, a corporation of New York Application December 26, 1947, Serial No. 793,978

13 Claims. (Cl. 219—8)

My invention relates to arc welding apparatus and more particularly to electric arc welding machines for alternately feeding metal electrodes to the work to form a continuous and uninterrupted weld of any desired length.

In metal arc welding, an arc is maintained between a fusible metal electrode and the work while the electrode is traversed along the seam to be welded. The welding arc fuses the metal of the work at the seam and at the same time fuses the electrode thereby adding additional metal to the molten pool which, upon solidification, forms the weld. In order to maintain the welding arc, the electrode must be fed toward the work in accordance with its consumption in the welding arc and for establishing the best welding conditions, the welding arc should be of substantially constant length.

When the arc welding operation is performed by hand, the operator is provided with an electrode holder by which arc welding current is supplied to the electrode and by which the electrode is manipulated by the operator while performing the welding operation. Standard length arc welding electrodes are available for such hand welding operations. These electrodes usually about eighteen inches in length, may or may not be provided with a flux coating containing ingredients which are used for stabilizing the arc, for shielding from the surrounding atmosphere the metal transferred through the arc, for forming slag materials which as a coating on the work shields the molten weld metal from the surrounding atmosphere and improves its quality while it is solidifying to form the weld or for any one or more of these purposes. The flux coating may be a thin coating or of substantial thickness as is usually the case where the electrode is intended to produce a refining and protective slag deposit on the work. Electrodes having heavy coating are supplied with one end bare of the covering so that this end may be inserted in the electrode holder in electrically conductive relation with the electrode clamp forming part of the electrode holder.

When hand welding with standard length arc welding electrodes such as above referred to, and which are commonly referred to as stick electrodes, it is, of course, apparent that the welding operation must be interrupted each time an electrode has been consumed to within a short distance of the electrode holder in which it is supported. The operator must then remove from the holder the stub end of the used electrode and substitute a new electrode, therefore, before he can continue the welding operation. Each time the welding arc is interrupted the molten metal at the arc crater solidifies and when the operator reinitiates his welding operation with a new electrode the cooled metal forming the walls of this crater must again be fused under conditions which will eliminate the entrapment of slag if a sound weld of high quality is to be obtained at this point of reinitiating the welding operation.

In order to eliminate the necessity of periodically interrupting the welding operation when making a continuous weld of substantial length, many types of automatic arc welding machines have been proposed. The most usual form of automatic arc welding machine is one in which an electrode of indefinite length is supplied from a coil and fed to the work by automatic means in a manner to maintain the welding arc at a substantially constant length. In most arrangements the feeding rate of the electrode is controlled by an electrical means responsive to an electrical characteristic of the arc in order to maintain the desired substantially constant arc length which as stated above establishes the best welding conditions. Since the arc voltage varies with the arc length for almost all arc atmospheres, a control responsive to arc voltage may be used although obviously other controls have and may be used for this purpose.

It has also been proposed to provide automatic machines for feeding stick electrodes such as are used for hand welding operations. These machines may be so constituted as to supply in end-to-end relation a plurality of stick electrodes having the leading and trailing ends joined mechanically or by welding in order to produce a continuous length of electrode material. On the other hand, these automatic stick feeding electrode machines may be arranged alternately to feed electrodes toward the work so that when one electrode is substantially consumed, another electrode is brought into arcing engagement with the work to take over the arc from the substantially consumed electrode, the holder for which is then returned to a loading position where a new stick electrode may be automatically supplied thereto or inserted by the welding machine operator.

It is an object of my invention to provide an improved arc welding machine of the type last referred to above.

It is a further object of my invention to provide an automatic arc welding machine in which stick electrodes are fed in overlapping positions relative to one another so that periodically the leading end of a new electrode is within arcing distance of the work and the arcing terminal of a substantially consumed electrode at which time the arc is transferred to the new electrode by returning the substantially consumed electrode to its loading position.

It is another object of my invention to feed each new electrode with its leading end sprung from its normal position so that at the time of transferring the arc from a substantially consumed electrode to a new electrode, the arcing terminal of the new electrode immediately assumes a position over the molten crater formed in the work while welding with the substantially consumed electrode and continues the welding operation before this molten crater has an opportunity to solidify.

It is also an object of my invention to provide an automatic stick feeding arc welding machine in which the electrodes are traversed relative to the work and fed thereto at a rate corresponding to their rate of consumption in the welding arc.

It is another object of my invention to provide a light weight automatic stick feeding arc welding machine of simple construction, which can be operated by an attendant who is not a skilled welder to produce welds of any desired length and of uniform high quality.

Further objects of my invention will become apparent from a consideration of the following description of one embodiment thereof shown in the accompanying drawings in which Figs. 1 and 2 are respectively side and rear end views of the welding machine, Fig. 3 is a view of one of the electrode holders thereof, and Figs. 4, 5, 6, and 7 are views illustrating respectively the operating arrangement of certain parts of the machine at the time a new electrode and the electrode being consumed are being simultaneously fed to the work, at the time the new electrode is advanced into arcing relation to the work, at the time the stub end of substantially consumed electrode is withdrawn from the work to transfer the arc to the new electrode, and at the time the stub end of the substantially consumed electrode has been returned to the loading position where it is removed and a new electrode substituted in its place.

In accordance with the illustrated embodiment of my invention, stick electrodes are fed from a loading position toward the work so that periodically the leading ends of a new electrode and of a substantially consumed electrode are simultaneously within arc transferring distance of one another and within arcing distance of the work whereupon the substantially consumed electrode is withdrawn from the work and returned to its loading position. The electrodes are supported in holders having electrode clamping means and electrode guiding means. The holders and electrodes therein are fed along the same path of travel to the work with the leading end of a new electrode sprung out of alignment with the substantially consumed electrode and held in overlapping position relative thereto by the electrode guide on the holder for the substantially consumed electrode. At the time both of the electrodes are within arcing relation to the work and arc transferring relation to one another, the stub end of the substantially consumed electrode is abruptly withdrawn from the work in a manner to transfer the arc to the leading end of the new electrode and the holder of the stub end of the substantially consumed electrode is then withdrawn from the path of travel of the holder for the new electrode so that the new electrode will immediately assume its normal position over the molten crater that has been produced in the work by the arc between the substantially consumed electrode and the work. After the holder for the substantially consumed electrode has passed in its return travel the holder for the new electrode, it is then returned to a position in alignment therewith, where during a period of rest, the stub end of the substantially consumed electrode is removed therefrom and a new electrode substituted therefor by the operator.

As shown in the drawings, the heavily coated stick electrodes 1 and 2 have their bared end portions inserted in and held by the electrode clamp forming part of each of the electrode holders 3. The leading end of the new electrode 1 rests in a groove-like guide extending along the back side of the lower electrode holder. The structure of these electrode holders is better shown in Fig. 3. The electrode clamp forming part of each electrode holder 3 comprises a hole or socket 4 extending into the lower end of the electrode holder past the end of a thumb screw 5 which is threaded into the side of the electrode holder so that its inner end engages the end of the electrode inserted in socket 4. The electrode guide previously referred to forms a part of each electrode holder and comprises a groove 6 extending along the back side thereof.

Each of the electrode holders 3 is mounted in alignment with one another on the insides of the outer ends of levers 7 by means of which the holders are held in alignment with one another along their path of feeding travel to the work and by means of which the holder of a substantially consumed electrode may be moved out of the path of travel of the holder for a new electrode while the holder for a substantially consumed electrode is being returned to its loading position. In Fig. 1 of the drawings the upper electrode holder 3 is shown in its loading position at the time it is about to be moved therefrom toward the work by the mechanism hereinafter to be described. The other end of each of the levers 7 is pivotally supported on arms 8 which project from carrier plates or carriages 9 mounted on a frame 10 for non-interfering relative movement toward and away from the work along parallel paths of travel on the frame. For purposes of adjustment, the inner ends of the arms 8 are provided with longitudinal slots through which extend the bolts by means of which these arms are attached to the carrier plates. Thus by loosening the nuts for these bolts it is possible to provide a slight adjustment in the amount of extension of the arms 8 from their carrier plates 9.

When the electrode holders 3 have been returned by their carrier plates to their loading position as shown by the upper electrode holder in Fig. 1, they engage a cam 11 by means of which they are moved to this position against the bias of springs 12 and held in this position by arms 13 slidably mounted on the carrier plates 9. Opposite ends of these springs 12 are attached by pins to the carrier plates and the arms 7. As shown in Fig. 1 of the drawings these movable holding arms 13 have their outer ends attached to the mid portions of levers 7 and their inner ends slotted for a headed pin 14 by which they are held for sliding movement on the carrier plates. Each of the arms 13 is provided with a latch 15 biased by a spring 16 into engagement with a catch block 17 mounted on the carrier plates. One end of each latch 15 is pivotally supported between plates 18 bolted to the side surfaces of the portions of the arms 13 which overlay carrier plates 9 and its other end 19 projects outwardly beyond its carrier plate for actuation by a trip gate 20. These trip gates are located at the lower end of the frame 10 and are biased to operating positions as shown, by springs 21 from which they may be moved during the downward travel of the carrier plates so that the latches are operated only after the carrier plates have made a pre-determined return movement to their loading position when the rollers on the ends of their arms 19 engage the outside camming surfaces of these trip gates 20 and are moved in directions to disengage the latches and catches and allow arms 13 to move inwardly toward their carrier plates 9 under the bias of springs 12. The inner positions of arms 13 on their carrier plates are determined by a shouldered portion of each engaging its catch after the holding position thereof has been moved from engagement with its catch to release these arms from their cocked or extended positions.

Welding current is supplied to the electrode holders 3 and the electrodes mounted therein by means of two cables 22, one end of each of which is attached to a terminal block 23 on each of the levers 7. These levers are formed of an electrically conductive material as are the electrode holders 3. The levers 7 are insulated from their carrier plates by forming the arms 8 and 13 of electrically insulating material. The ends of springs 12 which are attached to levers 7 are insulated therefrom by providing insulated blocks 24 on the levers 7 for the pins to which the ends of the springs 12 are attached. Cam 11 which comes into engagement with the electrode holders to cock the supporting mechanism therefor is also made of insulating material or electrically insulated from the frame 10.

The carrier plates 9 are mounted on opposite sides of the frame 10 for non-interfering relative movement along parallel paths of travel toward and away from the work. Each of the carrier plates is provided with four rollers 25 which are grooved for engaging the edges of the side plates 26 and 27 of the frame. These side plates are spaced from one another to form parallel slots which act as guides. The inner plates 26 are mounted in the frame by being supported on a plurality of arms 28 one end of each of which is attached to the inner plates 26 and the other end of which is attached to the frame structure to which the plates 27 are also attached. These arms, of course, are so shaped as to be removed from the path of travel of the rollers 25 as these rollers move along their guides formed by the edges of the plates 26 and 27.

The carrier plates 9 are moved from their loading position by means of an endless belt 29 which in the arrangement illustrated is a block chain. This chain 29 is mounted on sprockets 30 rotatably supported in the upper and lower portions of the frame 10. These sprockets constitute circular supports which position a portion of the belt 29 for movement toward the work lengthwise of the parallel paths of travel of the carrier plates 9 on the frame.

Substantially triangular shaped lugs 31 are alternately mounted on opposite sides of the chain 29 and are spaced from one another by the consumable length of the electrodes 1 and 2. These lugs in their path of movement toward the work engage abutments 32 on the carrier plates and alternately move the carrier plates from their loading positions toward the work until at the bottom of the frame, at a time just prior to the transfer of the arc from a substantially consumed electrode to a new electrode, they are moved laterally relative to one another for disengagement as the chain travels around the lower sprocket 30. The lugs 31 are substantially triangular in shape so that at the time when the rate of travel of the chain toward the work is decreased by its passage around its lower supporting sprocket, the concurrent turning movements of the lugs impart to the carrier plates driven thereby an additional travel toward the work so that throughout the entire path of travel of the carrier plates toward the work, and while the electrodes mounted thereon are in arcing engagement with the work, the electrodes and carrier plates are moved at a substantially uniform rate of speed toward the work and at a speed corresponding to that of the straight portions of the chain. This will insure that any automatic means provided for maintaining a substantially constant arc length between the substantially consumed electrode and the work will not increase its speed at the time of arc transfer and bring the leading end of the new electrode toward the work at too rapid a rate of speed.

Rotation is imparted to the upper sprocket 30 by means of a drive shaft 33, the upper end of which is connected through bevel gears 34, spur gears 35, and the shafting therefor with a worm 36 which engages a worm wheel 37 mounted for driving engagement on the shaft of the sprocket 30. Its direction of rotation is such as to feed toward the work that portion of the belt which positions the driving lugs 31 for engagement with the abutments 32 on the carrier plates 9 in order to move these carrier plates from their loading position.

The drive shaft 33 extends lengthwise of the frame 10 and is supported for rotation in arms 38 and 39 forming part of the frame. The lower end of the drive shaft 33 extends into a gear box 40 and is connected by gearing therein and through a flexible shaft 41 to the driving motor 42.

The carrier plates 9 are biased to their loading position against a stop 43 forming part of the cocking cam 11 which is mounted on the frame 10 and engages the electrode holders 3 to move them to their outer or electrode feeding position. The stop 43 is so positioned as to engage the back ends of the electrode holders as shown in Fig. 1.

The carriages or carrier plates are raised to their loading positions by means comprising a plurality of flexible members such as wire cables 44 one end of each of which is attached to one of the supporting bolts for the arms 8 and the other end of each of which is coiled about and attached to drums or spools 45 and 46. The upper spool 45 is provided with a hollow hub extension journaled about the upper end of the drive shaft 33. The lower end of this hub extension is attached to the upper end of a coil spring 47, the lower end of which is attached to a hollow housing 48. The upper end of this housing 48 is attached to the hub extension of the spool 46 which is journaled about the hub extension for the spool 45. The spring 47 is wound up as the cable 44 is withdrawn from one of the spools and is consequently tensioned to impart rotation to the other spool in a direction to wind its cable thereabout when retracting the carrier plate for a substantially consumed electrode. The cables pass about idler pulleys 44' to position them properly relative to the carrier plates and the spools about which they are wound. The spring 47 is located within and between housing 48 and a housing 48' for the drive shaft 33. The housing 48 extends through a bracket 49 attached to the front of frame 10.

For the convenience of the operator in handling the arc welding machine, it is provided with handles 50 and 51. The inner end of handle 50 is mounted on the bracket 49 above referred to and the handle 51 is a bar extending transversely of the frame at its upper rear portion. The handle 50 has mounted thereon a clamp 52 which serves as a terminal support for the cable 53 by which electric current is supplied to the electrode holders through the branch conductors 22 previously referred to. The terminals of these conductors are held together on the clamp by the nut of a bolt extending through the clamp.

The frame 10 of the arc welding machine is supported on two rollers 54 and 55 for movement along the work. The roller 54 is located immediately under the frame 10 at a position closely adjacent to the arcing terminals of the electrodes. If desired it may be provided with a V-shaped perifery in order to ride along a V-shaped welding groove in advance of the welding arc and position it relative to the seam being welded. Roller 54 by reason of its proximity to the welding arc is subjected to weld spatter and consequently is provided with a shield 56 located between it and the arcing terminals of the electrodes.

Since in their retracting positions the electrode holders 3 are positioned very close to the frame 10 of the welding machine, the rear edge of this frame may be provided with an electrically insulating strip 57 in order to prevent any short circuit that might occur if the electrode holders or the electrodes supported therein came into engagement with the frame which, of course, is grounded by reason of its connection and support through wheel 54 which rides on the work.

The machine is traversed along the work by the traction of the roller 55. This roller is mounted for rotation in a frame 58 and is rotated by means of gearing hidden in the illustrated view by the frame 58 and connected by spur gears 59 and a flexible shaft 60 to a rigid shaft 61 which is journaled in a support 62 on the frame 10. One end of shaft 61 extends into the gear box 40 where it is connected with the terminal of the flexible shaft 41 which also makes a driving engagement with the drive shaft 33 above referred to.

The inclination to the work of the machine frame 10 and of the electrodes mounted thereon may be varied by adjusting the telescoping members of a brace 63 which are held in the desired position relative to one another by a clamp 64. The upper end of this brace is attached to the handle 50 mounted on bracket 49 above referred to and its lower end is attached to the frame 58 for the traction wheel 55. This frame 58 is also connected through spacing members 65 to the lower forward corner of the frame 10.

The mechanism above described propels the welding machine along the work and alternately feeds the carrier plates toward the work so that periodically when an electrode in one of the holders is substantially consumed both of the electrodes in said holders are in arcing positions relative to the work at which time the holder of a substantially consumed electrode becomes disengaged from its driving means and is free to return to its loading position. After the carrier plate of this substantially consumed electrode has moved from the work a predetermined distance, the latching means above referred to is operated to release the supporting lever for the holder of the substantially consumed electrode so that this lever may move to its inner portion and thereby remove the electrode holder supported thereon out of the path of travel of the other electrode holder. Before the latch is operated the stub end of the substantially consumed electrode is moved a short distance from the work along its path of travel to the work and this transfers the arc to the new electrode which thereupon assumes a position directly over the arc crater as soon as the electrode holder for the substantially consumed electrode has been moved out of the path of travel of the electrode holder for the new electrode. In this way the molten metal at the arc crater never has an opportunity to solidify and the welding operation consequently become continuous. Thereafter the holder for the substantially consumed electrode is returned to its loading position where it is again moved into alignment with the other electrode holder and is in a condition of rest for a sufficient length of time so that the operator may remove the stub end of the substantially consumed electrode and substitute a new electrode therefor.

The operation of the automatic arc welding machine above described will become apparent from a consideration of the positions of the parts of the machine as shown in Figs. 1, 4, 5, 6 and 7.

In Fig. 1 the upper electrode holder 3 is about to be moved from its loading position toward the work at the same rate of travel as the partially consumed electrode 2 is being fed to the work by its electrode holder. Immediately thereafter both the upper and lower carrier plates for these electrode holders will be moved in unison toward the work by the travel of the chain 29 which is imparted to these carrier plates by the lugs 31 thereof engaging the abutments 32 of these carrier plates. It will be noted that the electrode holders 3 are in alignment with one another and that the leading end of the new electrode 1 has been sprung to the rear of the direction of travel of the welding machine along the work by being positioned in the electrode guide of the lower electrode holder with a predetermined amount of overlap. Consequently as the partially consumed electrode is further consumed the leading end of the new electrode 1 will approach closer and closer to the work as shown in Fig. 4. Eventually, the leading end of the new electrode 1 will be within arcing distance of the work and within arc transferring distance of the stub end of the substantially consumed electrode 2 as shown in Fig. 5.

Just prior to this time the downward movement of the travel carriage 9 for the substantially consumed electrode 2 has advanced the arm 19 of the latch 15 down past the trip gate 20 which was pushed out of operating position against the action of its biasing spring 21 by its engagement with arm 19 of latch 15. In Fig. 5 the parts are shown in the positions they assume after the arm 19 of latch 15 has passed beyond the trip gate 20 and at the time the arc is to be transferred from the substantially consumed electrode 2 to the leading end of the new electrode 1.

As soon as the lug 31 and abutment 32 disengage one another and allow the carrier plate 9 for the substantially consumed electrode to move upwardly in response to the pull of its retracting cable 44, the stub end of the substantially consumed electrode 2 is moved upwardly along its path of travel toward the work for a short distance until the arm 19 of latch 15 engages the trip gate 20 and disengages the latch from its catch 17. This allows sliding arm 13 to move inwardly across its carrier plate 9 under the action of spring 25 which moves the lever 7 to its inner position which removes the electrode holder 3 to the position shown in dotted lines where it is out of the path of travel of the electrode holder 3 now feeding the new electrode into arcing engagement with the work. The movement of the electrode holder for the stub end of the substantially consumed electrode to its retracted position also allows the new electrode 1 to move immediately over the molten crater from the sprung position in which it had been previously held by the guide in the electrode holder for the substantially consumed electrode. This facilitates establishment of the arc between the new electrode and the work.

Thereafter the electrode holder for the substantially consumed electrode and its carrier plate is returned to the loading position where it comes to rest against the stop 43 forming a part of the cam 11 which has previously engaged this electrode holder and moved it to a position in alignment with the electrode holder now feeding the new electrode into arcing engagement with the work. It is held in this position by the re-engagement of the holding portion of latch 15 with its catch 17. The stub end of the substantially consumed electrode 2 may then be removed from the electrode holder 3 and another new electrode, shown in dotted lines, then substituted therefor.

The feeding operation thus continues and alternately advances from its loading position a new electrode and feeds it to the work where it takes over the welding arc at the time the electrode that has been in arcing engagement with the work has been substantially consumed. By reason of the rapid rate of travel of the carrier plates to their loading positions, a substantial interval of time is provided during which the carrier plates are in their loading positions and stationary so that the operator may readily remove the stub ends of the substantially consumed electrodes and replace them with new electrodes.

It will thus be seen that I have provided means for feeding the electrode holders alternately from their electrode loading positions toward the work one behind the other with a spacing such that the electrodes mounted in the electrode holders overlap one another by a variable decreasing amount until both of the electrode holders are moving toward the work, when the spacing becomes a maximum and equal to a consumable portion of the electrodes. Furthermore, I have provided means effective at the time each of the electrodes in their electrode holders are in arcing positions relative to the work for returning the holder of a substantially consumed electrode to its loading position along a path of travel which initially corresponds with its feeding path of travel, is then displaced from its feeding path of travel so that the electrode holders may pass one another without interference, and finally at its loading position corresponds to the beginning of its feeding path of travel. It is to be noted that the initial return movement of an electrode holder to its loading position serves to transfer the arc from the substantially consumed electrode in one of the electrode holders to the new electrode in the other of the electrode holders.

It is, of course, apparent that my invention above disclosed by describing a particular embodiment thereof may be variously modified without departing from the spirit and scope of the teaching thereof. Thus, for example, mechanisms other than those described may be employed to obtain the sequence of operations by which the electrode holders are positioned relative to one another and moved toward and away from the work in accordance with my invention. It is, of course, not necessary that the electrode holders be moved away from the work by means of a biasing means since a positive power drive of any suitable type may be employed for this purpose. Furthermore, it is quite apparent that the electric motor 42 described above for feeding electrodes toward the work may be variously controlled in accordance with an electrical characteristic of the welding circuit to maintain the welding arc at a substantially constant length. Likewise it is not necessary to have the feed motor 42 mounted independently of the welding machine, since under certain circumstances it may be desirable to mount this motor on the frame of the welding machine. Also, my invention is not limited to embodiment in portable machines such as illustrated, since the same mechanism employed in the portable machine may also be used in stationary type arc welding machines. These and other modifications will occur to those skilled in the art to which my invention relates.

Therefore, while I have shown and described a particular embodiment of my invention it will be obvious to those skilled in the art that the above changes, as well as many others, may be made without departing from my invention in its broader aspects, and I therefore aim in the appended claims to cover all such changes and modifications as will fall within the true spirit and scope of my invention.

What I claim as new and desire to secure by Letters Patent of the United States is:

1. Arc welding apparatus comprising a plurality of electrode holders, means for supplying arc welding current to said holders and to the electrodes mounted therein, means for alternately feeding said holders along a common path and in alignment with one another from a loading position toward the work and periodically at the time one of said electrodes in one of said holders is substantially consumed for simultaneously feeding both of said holders along said common path and in alignment with one another toward the work, means effective at the time both of said electrodes in said holders are in arcing positions to the work for withdrawing said holder of the substantially consumed electrode from the work along its path of travel when feeding said electrode to the work, means effective after said holder of said substantially consumed electrode has been withdrawn a predetermined distance from the work by said last mentioned means for moving said holder out of the path of travel of said other holder, and means effective after said holders have passed one another for returning said holder of said substantially consumed electrode to its loading position in alignment with said other holder.

2. Arc welding apparatus comprising a plurality of electrode holders, each having an electrode clamp for holding an electrode and an electrode guide for positioning a new electrode mounted in said clamp of the other of said holders with its end overlapping and within arc transferring distance of the arcing end of a substantially consumed electrode in said clamp when the ends of both of said electrodes are within arcing distance of the work, means for supplying arc welding current to said holders and to the electrodes mounted therein, means for alternately feeding said holders along a common path and in alignment with one another from a loading position toward the work and periodically at the time one of said electrodes in one of said holders is substantially consumed for simultaneously feeding both of said holders along said common path and in alignment with one another toward the work, means effective at the time both of said electrodes in said holders are in arcing positions to the work for withdrawing said holder of the substantially consumed electrode from the work along its path of travel when feeding said electrode to the work and thereby transferring the arc at its terminal to the terminal of the new electrode in said other holder, means effective after said holder of said substantially consumed electrode has been withdrawn a predetermined distance from the work by said last mentioned means for moving said holder out of the path of travel of said other holder, and means effective after said holders have passed one another for returning said holder of said substantially consumed electrode to its loading position in alignment with said other holder.

3. Arc welding apparatus for feeding stick electrodes in succession to the work and for transferring the welding arc from a substantially consumed electrode to a new electrode, said apparatus comprising a plurality of electrode holders, means for supplying arc welding current to said holders and to the electrodes mounted therein, means for feeding said holders from a loading position toward the work in leading and trailing positions relatively to one another, along a common path and in alignment with one another with a lengthwise spacing equal to the consumable portion of an electrode, means on said holders for positioning the leading end of a new electrode in one of said holders sprung out of alignment with and to one side of but within arc transferring distance of the arcing end of a substantially consumed electrode in the other of said holders at the time said new electrode is within arcing distance of the work, means effective at the time both of said electrodes in said holders are in arcing positions to the work for abruptly withdrawing said holders of the substantially consumed electrode from the work along its path of travel when feeding said electrode to the work and thereby transferring the arc at its terminal to the terminal of the new electrode in said other holder, means effective after said holder of said substantially consumed electrode has been withdrawn a predetermined distance from the work by said last mentioned means for moving said holder out of the path of travel of said other holder, and means effective after said holders have passed one another for returning said holder of said substantially consumed electrode to its loading position in alignment with said other holder.

4. An arc welding apparatus for feeding stick electrodes in succession to the work and for transferring the welding arc from a substantially consumed electrode to a new electrode, said apparatus comprising a plurality of electrode holders, means for supplying arc welding current to said holders and to the electrodes mounted therein, means for traversing said holders in the direction of welding along the work, means for feeding said holders from a loading position toward the work in leading and trailing positions relatively to one another along a common path and in alignment with one another with a lengthwise spacing equal to the consumable portion of an electrode, means on said holders for positioning the leading end of a new electrode in one of said holders sprung out of alignment with and to the rear of but within arc transferring distance of the arcing end of a substantially consumed electrode in the other of said holders at the time said new electrode is within arcing distance of the work, means effective at the time both of said electrodes in said holders are in arcing positions to the work for abruptly withdrawing said holder of the substantially consumed electrode from the work along its path of travel when feeding said electrode to the work and thereby transferring the arc at its terminal to the terminal of the new electrode in said other holder, means effective after said holder of said substantially consumed electrode has been withdrawn a predetermined distance from the work by said last mentioned means for moving said holder out of the path of travel of said other holder, and means effective after said holders have passed one another for returning said holder of said substantially consumed electrode to its loading position in alignment with said other holder.

5. Arc welding apparatus for feeding stick electrodes in succession to the work and for transferring the welding arc from a substantially consumed electrode to a new electrode, said apparatus comprising a plurality of electrode holders, means for supplying arc welding current to said holders and to the electrodes mounted therein, means for alternately feeding said holders from a loading position toward the work in leading and trailing positions relatively to one another along a common path and in alignment with one another and for simultaneously feeding both of said holders to the work with a spacing such that the end of a new electrode overlaps the stub end of a substantially consumed electrode, clamping means on each of said holders for holding in alignment with one another the clamped ends of electrodes mounted in said holders, guiding means on each of said holders for springing the leading end of a new electrode in said trailing holder from a position in alignment with the electrode in said leading holder to a position to one side of the electrode in said leading holder and with a spacing such that said new electrode is within arc transferring distance of the stub end of a substantially consumed electrode in said leading holder when the end of said new electrode is within arcing distance of the work, means effective at the time both of said electrodes in said holders are in arcing positions to the work for withdrawing said holder of the substantially consumed electrode from the work along its path of travel when feeding said electrode to the work and thereby transferring the arc at its terminal to the terminal of the new electrode in said other holder, means effective after said holder of said substantially consumed electrode has been withdrawn a predetermined distance from the work by said last mentioned means for moving said holder out of the path of travel of said other holder, and means effective after said holders have passed one another for returning said holder of said substantially consumed electrode to its loading position in alignment with said other holder.

6. Arc welding apparatus for feeding stick electrodes in succession to the work and for transferring the welding arc from a substantially consumed electrode to a new electrode, said apparatus comprising a plurality of electrode holders, means for supplying arc welding current to said holders and to the electrodes mounted therein, means for traversing said holders in the direction of welding along the work, means for alternately feeding said holders from a loading position toward the work in leading and trailing positions relatively to one another along a common path and in alignment with one another and for simultaneously feeding both of said holders to the work with a spacing such that the end of a new electrode overlaps the stub end of a substantially consumed electrode, clamping means on each of said holders for holding in alignment with one another the clamped ends of electrodes mounted in said holders, guiding means on each of said holders for springing the leading end of a new electrode in said trailing holder from a position in alignment with the electrode in said leading holder to a position to the rear of the electrode in said leading holder and with a spacing such that said new electrode is within arc transferring distance of the stub end of a substantially consumed electrode in said leading holder when the end of said new electrode is within arcing distance of the work, means effective at the time both of said electrodes in said holders are in arcing positions to the work for withdrawing said holder of the substantially consumed electrode from the work along its path of travel when feeding said electrode to the work and thereby transferring the arc at its terminal to the terminal of the new electrode in said other holder, means effective after said holder of said substantially consumed electrode has been withdrawn a predetermined distance from the work by said last mentioned means for moving said holder out of the path of travel of said other holder, and means effective after said holders have passed one another for returning said holder of said substantially consumed electrode to its loading position in alignment with said other holder.

7. Arc welding apparatus comprising a frame, two carrier members mounted for non-interfering relative movement along parallel paths on said frame toward and away from the work, an electrode holder mounted on each of said members for movement relative thereto from positions in alignment with one another to positions permitting passage of said holders when said members therefor are moving in opposite directions along said frame, each of said holders having an electrode clamp for holding an electrode and an electrode guide for positioning an electrode mounted in said clamp of the other of said holders with its end overlapping and within arc transferring distance of the end of a substantially consumed electrode in said clamp when the ends of both of said electrodes are within arcing distance of the work, means for moving said members from their loading positions to the work at speeds corresponding to the arc consumption rate of electrodes in said holders mounted on said members, means for returning said members to their loading positions at a more rapid rate than they are moved therefrom to the work, means effective at the time both of said electrodes are in arcing position to the work for operating said last-mentioned means to return to its loading position said member carrying said holder of a substantially consumed electrode, means responsive to a predetermined return travel of said member carrying said holder of a substantially consumed electrode for withdrawing said holder from the path of travel of said other holder until said holders have passed one another, means responsive to the movement to its loading position of said member carrying said holder of said substantially consumed electrode for returning said holder of said substantially consumed electrode to a position in alignment with said other holder when said member has returned to its said loading position, and means for supplying welding current to each of said electrode holders and the electrodes mounted therein.

8. Arc welding apparatus comprising a frame, two carrier plates mounted for non-interfering relative movement along parallel paths on said frame toward and away from the work, an electrode holder mounted on each of said plates for movement relative thereto from positions in alignment with one another to positions permitting passage of said holders when said carrier plates therefor are moving in opposite directions along said frame, each of said holders having an electrode clamp for holding an electrode and an electrode guide for positioning an electrode mounted in said clamp of the other of said holders with its end overlapping and within arc transferring distances of the end of a substantially consumed electrode in said clamp when the ends of both of said electrodes are within arcing distance of the work, means for moving said plates from their loading positions to the work at speeds corresponding to the arc consumption rate of electrodes in said holders mounted on said plates, means for returning said plates to their loading positions at a more rapid rate than they are moved therefrom to the work, means effective at the time both of said electrodes are in arcing position to the work, for operating said last mentioned means to return to its loading position said plate carrying said holder of a substantially consumed electrode, means responsive to a predetermined travel to its loading position of said plate carrying said holder of a substantially consumed electrode for withdrawing said holder from the path of travel of said other holder, means responsive to the movement to its loading position of said plate carrying said holder of said substantially consumed electrode to return said holder of said substantially consumed electrode to its position in alignment with said other holder by the time said plate arrives at its loading position, and means for supplying welding current to each of said electrode holders and the electrodes mounted therein.

9. Arc welding apparatus comprising a frame, two carriages mounted for non-interfering relative movement along parallel paths on said frame toward and away from the work, two levers each of which is pivotly supported at one end on one of said carriages and has its other end yieldingly biased to an inner position relative to its said carriage from which it may be moved to an outer position relative thereto, an arm slidably mounted on each of said carriages and attached to said lever mounted thereon, a latch and catch therefor respectively mounted on each of said slidable arms and its associated carriage for holding each of said slidable arms in its extended position relative to its said carriage and thereby positioning its said associated lever in its outer position relative to its said carriage, an electrode holder electrically insulated from and mounted on the outer end of each of said levers in alignment with one another when said levers are in their outer position, said electrode holders each having an electrode clamp for holding an electrode and an electrode guide for positioning an electrode mounted in said clamp of said other holder with its end overlapping and within arc transferring distance of the end of a substantially consumed electrode in said holder when the ends of both of said electrodes are within arcing distance of the work, means for supplying arc welding current to said holders, means for propelling said carriages alternately toward the work and periodically when an electrode in one of said holders is substantially consumed for simultaneously propelling both of said carriages toward the work, means effective when each of said electrodes in said holders are in arcing positions relative to to the work for moving away from the work that one of said carriages for said holder of the substantially consumed electrode, means effective after a predetermined movement of said one of said carriages away from the work a sufficient distance to permit transfer of the arc to the new electrode, for disengaging said latch and catch and releasing said lever for movement to its inner position in which said holder for said substantially consumed electrode is moved out of the path of travel of said other holder, and means effective after said holders have passed one another during their travel in opposite directions, for returning said lever to its outer position relative to its said carriage and thereby again position said holders in alignment with one another.

10. Arc welding apparatus comprising a frame, two carrier plates mounted for non-interfering relative movement along parallel paths on said frame toward and away from the work, an electrode holder mounted on each of said plates and movable relative thereto from positions in alignment with one another to positions permitting passage of said holders when said carrier plates therefor are moving in opposite directions along said frame, means for supplying welding current to said holders and the electrodes mounted therein, an endless belt mounted on circular supports rotatably mounted at the top and bottom of said frame so that a portion of said belt extends lengthwise of said parallel paths of travel of said carrier plates on said frame, means for rotating one of said circular supports to propel said portion of said belt toward the work, driving lugs alternately mounted on opposite sides of said belt and spaced from one another by the consumable length of the electrodes mounted in said holders, abutments mounted on said plates in the path of travel of said lugs toward the work, said lugs alternately engaging said abutments to propel said carrier plates toward the work and being moved laterally from that one of said abutments of said carrier plate from said holder of a substantially consumed electrode by passage of said belt about said circular support at the bottom of said frame when both of said electrodes are positioned within arcing distance of the work by said holders on said carrier plates, means connected to each of said carrier plates and said frame for biasing said carrier plates away from the work to its loading position, means responsive to the movement of each of said carrier plates to its loading position for withdrawing said holder mounted thereon out of the path of travel of said other holder until said holders pass one another, and means responsive to the movement of each of said carrier plates to its loading position and effective after said holders mounted on said plates have passed one another for returning said holder mounted thereon to its position in alignment with said other holder by the time said carrier plate therefor has arrived at its loading position.

11. Arc welding apparatus for feeding stick electrodes in succession to the work and for transferring the welding arc from a substantially consumed electrode to a new electrode, said apparatus comprising a frame, two carrier plates mounted for non-interfering relative movement along parallel paths on said frame toward and away from the work, an electrode holder mounted on each of said plates and movable relative thereto from positions in alignment with one another to positions permitting passage of said holders when said carrier plates therefor are moving in opposite directions along said frame, means for supplying welding current to each of said holders and the electrodes supported therein, an endless belt mounted on said frame so that a portion of said belt extends lengthwise of said parallel paths of travel of said carrier plates on said frame, means for propelling said belt so that said portion thereof travels toward the work at a speed corresponding to the consumption rate of an electrode in the welding arc, driving lugs alternately mounted on opposite sides of said belt and spaced from one another by the consumable length of a stick electrode, abutments mounted on said plates in the path of travel of said lugs, said lugs and said abutments being arranged for engagement so that periodically both said carrier plates are moving toward the work to position a new electrode in one of said holders mounted on one of said carrier plates within arcing distance of the work and the substantially consumed arc supporting electrode in the other of said holders mounted on the other of said carrier plates and then for disengagement to release said carrier plate of said holder of a substantially consumed electrode, means connected to each of said carrier plates and said frame for biasing said carrier plates away from the work to its loading position, means responsive to the movement of each of said carrier plates to its loading position for withdrawing said holder mounted thereon out of the path of travel of said other holder until said holders pass one another, and means responsive to the movement of each of said carrier plates to its loading position and effective after said holders mounted on said carrier plates have passed one another for returning said holder mounted thereon to its position in alignment with said other holder by the time said carrier plate therefor has arrived at its loading position.

12. Arc welding apparatus for feeding stick electrodes in succession to the work and for transferring the welding arc from a substantially consumed electrode to a new electrode said apparatus comprising a frame, two carrier plates mounted for non-interfering relative movement along parallel paths of travel on said frame toward and away from the work, an endless belt mounted on circular supports rotatably mounted on said frame so that a portion of said belt extends lengthwise of said parallel paths of travel of said carrier plates on said frame, driving lugs alternately mounted on opposite sides of said belt and spaced from one another by the consumable length of a stick electrode, abutments mounted on said plates in the path of travel of said lugs so that said lugs engage said abutments until said belt travels around its circular support at the bottom of said frame at the time of initiating arc transfer from a substantially consumed electrode to a new electrode, a drive shaft extending lengthwise of said frame and rotatably supported thereon, a driving connection between one end of said drive shaft and one of said circular supports, a plurality of drums mounted for rotation about an axis corresponding to the longitudinal axis of said drive shaft, a spring located about said drive shaft and having opposite ends attached to said drums and tensioned to impart opposite rotation to said drums, flexible members each of which has one end attached to one of said drums for coiling thereabout and its other end attached to one of said carrier plates, said flexible members completing the biasing means including said spring and said drums by which said carrier plates are returned to their loading positions, means including a motor for imparting rotation to the other end of said drive shaft to feed toward the work that portion of said belt extending lengthwise of said paths of travel of said carrier plates along said frame, two levers each of which is pivotally supported at one end on one of said carrier plates and has its other end yieldingly biased to an inner position relative to its said carrier plate from which it may be moved to an outer position relative thereto, an arm slidably mounted on each of said carrier plates and attached to said lever mounted thereon, a latch and catch therefore respectively mounted on each of said arms and its associated carrier plate for holding each of said arms in its extended position relative to its said carrier plate and thereby positioning its said associated lever in its outer position relative to its said carrier plate, an electrode holder electrically insulated from and mounted on the outer end of each of said levers in alignment with one another when said levers are in their outer positions, said electrode holders each having an electrode clamp for holding one electrode and an electrode guide for positioning an electrode mounted in said clamp of said other holder with its end overlapping and within arc transferring distance of the end of a substantially consumed electrode in said holder when the ends of both of said electrodes are within arcing distance of the work, means for supplying arc welding current to said electrode holders, means operated by a predetermined return movement of each of said carrier plates to its loading position for releasing said latch and catch thereon and thereby permitting said arm and said lever thereon to move to their inner positions to withdraw said electrode holder mounted on said lever from the path of travel of said electrode holders toward the work, and means engaging said levers after said electrode holders thereon have passed one another during their travel in opposite directions for returning to their feeding positions in alignment with one another said electrode holders mounted on said levers.

13. Arc welding apparatus for feeding stick electrodes in succession to the work and for transferring the welding arc from a substantially consumed electrode to a new electrode said apparatus comprising a frame, two carrier plates mounted for non-interfering relative movement along parallel paths of travel on said frame toward and away from the work, an endless belt mounted on circular supports rotatably mounted on said frame so that a portion of said belt extends lengthwise of said parallel paths of travel of said carrier plates on said frame, triangularly shaped driving lugs mounted for turning movement with said belt about its said circular supports and spaced from one another alternately on opposite sides of said belt by the consumable length of a stick electrode, abutments mounted on said plates in the path of travel of said lugs, the concurrent turning movement of said lugs imparting a substantially constant rate of travel to said abutments and said carrier plates at the time just prior to the transfer of the arc from a substantially consumed electrode to a new electrode when said lugs are moving laterally relative to said abutments for disengagement as said belt travels around its circular support at the bottom of said frame, a drive shaft extending lengthwise of said frame and rotatably supported thereon, a driving connection between one end of said drive shaft and one of said circular supports, a plurality of drums mounted for rotation about an axis corresponding to the longitudinal axis of said drive shaft, a spring located about said drive shaft and having opposite ends attached to said drums and tensioned to impart opposite rotation to said drums, flexible members each of which has one end attached to one of said drums for coiling thereabout and its other end attached to one of said carrier plates, said flexible members completing the biasing means including said spring and said drums by which said carrier plates are returned to their loading positions, means including a motor for imparting rotation to the other end of said drive shaft to feed toward the work that portion of said belt extending lengthwise of said paths of travel of said carrier plates along said frame, two levers each of which is pivotally supported at one end on one of said carrier plates and has its other end yieldingly biased to an inner position relative to its said carrier plate from which it may be moved to an outer position relative thereto, an arm slidably mounted on each of said carrier plates and attached to said lever mounted thereon, a latch and catch therefore respectively mounted on each of said arms and its associated carrier plate for holding each of said arms in its extended position relative to its said carrier plate and thereby positioning its said associated lever in its outer position relative to its said carrier plate, an electrode holder electrically insulated from and mounted on the outer end of each of said levers in alignment with one another when said levers are in their outer positions, said electrode holders each having an electrode clamp for holding one electrode and an electrode guide for positioning an electrode mounted in said clamp of said other holder with its end overlapping and within arc transferring distance of the end of a substantially consumed electrode in said holder when the ends of both of said electrodes are within arcing distance of the work, means for supplying arc welding current to said electrode holders, means operated by a predetermined return movement of each of said carrier plates to its loading position for releasing said latch and catch thereon and thereby permitting said arm and said lever thereon to move to their inner positions to withdraw said electrode holder mounted on said lever from the path of travel of said electrode holders toward the work, and means engaging said levers after said electrode holders thereon have passed one another during their travel in opposite directions for returning to their feeding positions in alignment with one another said electrode holders mounted on said levers.

EVERETT F. POTTER.

REFERENCES CITED

The following references are of record in the file of this patent:

UNITED STATES PATENTS

| Number | Name | Date |
|---|---|---|
| 1,742,469 | Hand | Jan. 7, 1930 |
| 2,025,785 | Southgate | Dec. 31, 1935 |
| 2,085,808 | Krause | July 6, 1937 |

FOREIGN PATENTS

| Number | Country | Date |
|---|---|---|
| 718,578 | France | Nov. 4, 1931 |